United States Patent Office 3,433,761
Patented Mar. 18, 1969

3,433,761
FLOORING MATERIAL OF UNSATURATED POLYESTER RESIN ALUMINUM OXIDE GRIT AND CATALYST AND METHOD OF APPLICATION
Arthur W. Holle, 8858 W. 47th St., Brookfield, Ill. 60513
No Drawing. Filed May 20, 1966, Ser. No. 551,530
U.S. Cl. 260—40                                    8 Claims
Int. Cl. C08g 51/12; C08f 45/12; C09d 5/34

ABSTRACT OF THE DISCLOSURE

A flooring material comprising a composition consisting of an unsaturated polyester resin mixed with a catalyst and a grit of essentially aluminum oxide which forms a slurry spreadable on the floor surface to be coated.

This invention relates to floor covering which not only provides extended wear but also has exceptional non-skid characteristics.

The invention is particularly applicable to public carriers such as trains, busses and the like but not entirely restricted thereto. Public carriers in particular are subjected to hard wear and further to guard against excessive claims for personal injuries must provide flooring which will preserve the equipment and also have good anti-skid characteristics. The optimum flooring would also provide an aesthetic appearance and be relatively easy to apply.

The flooring material is adapted to be applied to a wood floor which has been thoroughly cleaned and sanded to provide a porous surface or to a clean metal surface which has been thoroughly cleaned and preferably roughened as by sandblasting or the like.

Onto this prepared surface I trowel my flooring material to a thickness of about $\frac{1}{4}''$ and smoothen the same to provide a flat plane surface. The material is then left to harden at room temperature preferably over 70° F. for a period of at least 30 minutes.

I prepare my flooring material mixture as follows:

Polyester resin _____lbs__ 10
Methylethylketone peroxide _____oz__ ½
Aluminum oxide grit 16–80 mesh grid particle
  size _____lbs__ 30

In certain of these mixtures the polyester consists of a solution of an alkyd resin prepared from propylene glycol, melic anhydride, and adipic acid in 30 percent of its weight of styrene.

In applying this material to a wood floor, the polyester resin penetrates the wood and forms a mechanical interlock therewith. The same occurs with a roughened metal surface. I have found that this material being thermoplastic yields with the base material to which it is applied and does not permit any moisture or corrosive agents such as salt or calcium chloride to penetrate to the base material. It withstands natural extremes of temperature without becoming brittle or softening. Preferably the aluminum oxide grit is a reclaimed material such as from grinding stones. It provides particles with many tentacles which hold firmly in the plastic and also provide a rough floor surface.

In order to coat large floor areas I prefer to secure a number of spaced parallel guide strips made of polystyrene to the flooring. These strips project from such flooring to a common height. Then I fill in the spaces therebetween with my material and trowel across the tops of these strips. The polystyrene strips bond with the polyester and integrate into a single floor slab.

In preparing the polyester any of the following formulations may be used:

Polyester 1

| Formulation | Mols | Weight (g.) |
|---|---|---|
| Maleic anhydride | 15 | 1,471 |
| Ethylene glycol | 16.5 | 1,024 |
| Total charge | | 2,495 |

Procedure.—Charge the ethylene glycol. Start the agitator, and introduce a slow stream of inert gas (nitrogen or carbon dioxide). Heat to about 80° C., and add the maleic anhydride which will melt almost immediately and mix with the glycol to give a clear limpid liquid. Increase the temperature to 180° C. over approximately 3 hours. At about 100° C. an exothermic reaction usually sets in, which will increase the temperature 10–30° C. by itself. When this increase is noted the heating should be decreased until the reaction is under control. Water of reaction starts to come over at 140–150° C. Samples should be taken of the resin once or twice every hour and the acid number determined.

The temperature is now increased to 200° C. over a period of 2 hours, and then further increased to 205–210° C., where it is maintained until the acid number is less than 50. Cool to about 100° C. and add 0.003% of tert.butyl catechol as inhibitor. When it is dissolved, the resin can be transferred to a suitable container.

A blanket of inert gas should always be used to protect an unsaturated polyester at elevated temperatures. It serves primarily to prevent discoloration, but will also decrease the risk of rapid polymerization which may set in at high temperatures (usually above 250° C., but sometimes even lower) especially in the presence of air. Since such a polymerization is exothermic it may become quite violent, and once started it is almost impossible to stop, especially in large batches.

Polyester 2

| Formulation | Mols | Weight (g.) |
|---|---|---|
| Maleic anhydride | 10 | 981 |
| Diethylene glycol | 11 | 1,167 |
| Total charge | | 2,148 |

Charge the glycol. Start the agitator and introduce a slow stream of inert gas. Heat to 80° C. and add the maleic anhydride. Bring the temperature up to 150° C. in one hour, and then increase the temperature at the rate of 10° C. per hour up to 190° C. When the acid number is about 60, vacuum is applied (100–200 mm. Hg residual pressure). The temperature is permitted to fall to about 170° C., and then vacuum treatment is continued until the acid number is below 50. Cool and add inhibitor.

Polyester 3

| Formulation | Mols | Weight (g.) |
|---|---|---|
| Maleic anhydride | 7.5 | 736 |
| Phthalic anhydride | 2.5 | 370 |
| Ethylene glycol | 2.75 | 171 |
| Diethylene glycol | 8.25 | 875 |
| Total charge | | 2,152 |

Charge the glycols. Start the agitator and introduce a slow stream of inert gas. Heat to about 80° C. and add the maleic anhydride followed by the phthalic anhydride. Fill the trap with xylene and then add an amount of xylene equal to approximately 5% of the total weight of the charge as shown above (2152×0.05=110 g.). Increase the temperature to 160° C. during the next hour. The heating should be adjusted so that refluxing is maintained, and water is removed by "azeotropic" distillation and collected in the trap where it can be measured. The exothermic reaction in the beginning of the experiment is less noticeable in a solvent system.

Let the temperature gradually rise to 200° C. over the following 3 hours. 200°–210° C. should take about 1 hour, and then the temperature is permitted to reach 215° C. where it is maintained until the acid number is less than 50. Samples are taken during the course of reaction as usual for the determination of acid numbers. The amount of water collected in the xylene trap will also serve as a check on how the reaction proceeds. The temperature of the reaction mass is controlled to a large extent by the amount of xylene present under refluxing conditions. Adjustments may become necessary, either by addition of some fresh xylene, or by permitting part of it to boil off.

When the acid number goes below 50, the xylene trap is emptied and the system put under a vacuum which is gradually increased so that a residual pressure of 100–200 mm. Hg is reached. The vacuum treatment will remove the xylene and will also bring down the acid number a little more. When no more xylene comes over, vacuum is discontinued and the batch is cooled down to about 100° C. Inhibitor is added.

Polyester 4

| Formulation | Mols | Weight (g.) |
|---|---|---|
| Maleic anhydride | 6.25 | 613 |
| Phthalic anhydride | 3.75 | 555 |
| Ethylene glycol | 5.25 | 326 |
| Diethylene glycol | 5.25 | 557 |
| Total charge | | 2,051 |

Charge the glycols. Start the agitator and introduce a slow stream of inert gas. Heat to about 80° C., and add the maleic anhydride followed by the phthalic anhydride. Let the temperature rise to 160° C. during 2 hours, and then to 200° C. during the following 2 hours. Increase to 210–215° C. the next hour and maintain this temperature until the acid number is below 60. Let the batch cool to about 200° C., and apply a low vacuum (600–700 mm. Hg) which is gradually increased as the temperature falls. Treat at about 170° C. and at 100–200 mm. Hg residual pressure until the acid number is below 35. Cool and add inhibitor.

Polyester 5

| Formulation | Mols | Weight (g.) |
|---|---|---|
| Maleic anhydride | 5 | 490 |
| Phthalic anhydride | 5 | 741 |
| Diethylene glycol | 11 | 1,167 |
| Total charge | | 2,298 |

Charge the glycol. Start the agitator and introduce a slow stream of inert gas. Heat to about 80° C., and add the maleic anhydride followed by the phthalic anhydride. Let the temperature rise to 150° C. in 2 hours, and then to 195° C. during the following 2 hours. Increase about 15° C. per hour until the temperature is 230° C., where it is maintained until the acid number is about 70. Increase to 245° C. and hold until the acid number is less than 50. Cool and add inhibitor.

Polyester 6

| Formulation | Mols | Weight (g.) |
|---|---|---|
| Fumaric acid | 4 | 464 |
| Phthalic anhydride | 8 | 1,185 |
| Ethylene glycol | 12.6 | 782 |
| Pentaerythritol | 0.15 | 20 |
| Total charge | | 2,451 |

Charge all ingredients except the pentaerythritol. Start the agitator and introduce a slow stream of inert gas. Fill the trap with xylene, and then add approximately 125 g. to the charge (=5% of total charge). Heat to 150° C. in about 1.5 hours, and then increase the temperature about 15° C. every hour. Keep at 210° C. until the acid number is under 75. Add pentaerythritol and maintain 210° C. for 30 minutes. Let the batch cool to about 190° C. and apply vacuum for removal of the xylene after the trap has been emptied. As the temperature falls to 170° C., increase vacuum so that the residual pressure comes down to 100–200 mm. Hg from about 600 mm. Hg at the beginning. End vacuum treatment, when the acid number is below 50. Cool and add inhibitor.

Polyester 7

| Formulation | Mols | Weight (g.) |
|---|---|---|
| Maleic anhydride | 7 | 686 |
| Phthalic anhydride | 1.5 | 222 |
| Adipic acid | 1.5 | 219 |
| Ethylene glycol | 5.5 | 341 |
| Diethylene glycol | 5.5 | 584 |
| Total charge | | 2,052 |

Charge the glycols. Start the agitator and introduce a slow stream of inert gas. Heat to about 80° C., and add the maleic anhydride followed by the phthalic anhydride and the adipic acid. Raise the temperature to 150° C. in 1 hour, and then about 10° C. per hour until the temperature has reached 210° C. Keep at 210° C. until the acid number is less than 60. Apply vacuum 100–200 mm. Hg residual and let the temperature fall to about 180° C. End vacuum treatment when the acid number is below 40. Cool and add inhibitor.

Polyester 8

| Formulation | Mols | Weight (g.) |
|---|---|---|
| Fumaric acid | 10 | 1,161 |
| Ethylene glycol | 6 | 372 |
| Isopropylidenebis-(p-phenyleneoxypropanol | 4.5 | 1,701 |
| Total charge | | 3,234 |

Charge the ethylene glycol. Start the agitator and introduce a slow stream of inert gas. Heat to approximately 100° C. Add isopropylidenebis(p-phenyleneoxypropanol-2) followed by the fumaric acid. Fill the trap with xylene and add a further 175 g. (about 5% of total charge). Increase the temperature to 150° C. in about 1 hour and establish reflux. Raise the temperature at that rate of about 5° C. per hour until 190° C. has been reached. Maintain 190° C. until the acid number is below 50. Empty the trap, and apply vacuum to remove the xylene. Maintain vacuum (100–200 mm. Hg residual pressure) until the acid number is about 35. Cool and add inhibitor.

See also U.S. Patent 2,195,362 Glycol-Maleic Acid Resin and Process for Making Same.

Preferably the resin should have the following optimum physical characteristics:

Viscosity of 77° F. _____ 3½ to 4.0 poises.
Specific gravity at 77° F. _____ 1.126.
Lbs. per gal. _____ 9.39.
Percent of polymerization _____ 100.
Color _____ APHA maximum dark amber.
Modulus of rigidity, torsion p.s.i. ____ 5700.
Tensile strength measured in p.s.i. ___ 1000.
Elongation before break in tension, percent _____ 44.5
Specific gravity _____ 1.23.
Water absorption percent _____ 0.41.
Barcal hardness _____ Impressor No. 935 (soft 20–30).
Durometer hardness type A2 _____ 95.

Having described the invention, I intend to cover my novel material and method of application thereof in the appended claims.

I claim:
1. A flooring material comprising a composition con- sisting of an unsaturated polyester resin mixed with a catalyst and a grit of essentially aluminum oxide to form a flowable slurry and wherein the ingredients of the mixture are in the proportion of about ten pounds of polyester resin, about one half ounce of catalyst and about thirty pounds of grit.

2. The invention according to claim 1 wherein the catalyst is methylethylketone peroxide.

3. The invention according to claim 1 wherein the grit comprises essentially aluminum oxide of between 16 and 80 mesh size.

4. The invention according to claim 1 and said polyester consisting of a solution of an alkyd resin, prepared from propylene glycol, maleic anhydride, and adipic acid in 30 percent of its weight of styrene.

5. The invention according to claim 1 and said polyester having the following characteristics:

| | |
|---|---|
| Viscosity of 77° F. | 3½ to 4.0 poises. |
| Specific gravity at 77° F. | 1.126. |
| Lbs. per gal. | 9.39. |
| Percent of polymerization | 100. |
| Color | APHA maximum dark amber. |
| Modulus of rigidity, torsion p.s.i. | 5700. |
| Tensile strength measured in p.s.i. | 1000. |
| Elongation before break in tension, percent | 44.5. |
| Specific gravity | 1.23. |
| Water absorption percent | 0.41. |
| Barcal hardness | Impressor No. 935 (soft 20–30). |
| Durometer hardness type A2 | 95. |

6. A flooring material according to claim 1 and said polyester resin prepared from unsaturated polycarboxylic acids or their anhydrides with organic polyols.

7. A flooring material of claim 6 wherein aromatic polycarboxylic acids or their anhydrides are used in conjunction with the unsaturated polycarboxylic acids or their anhydrides.

8. A flooring material of claim 6 wherein part of the unsaturate polycarboxylic acid or anhydride is replaced by a linear saturated polycarboxylic acid or anhydride.

References Cited

UNITED STATES PATENTS

| | | |
|---|---|---|
| 2,631,960 | 3/1953 | Dafter. |
| 3,008,387 | 11/1961 | Wittenwyler et al. |
| 3,033,088 | 5/1962 | Wittenwyler 117—148 |
| 3,077,424 | 2/1963 | Maker et al. 260—40 |
| 3,078,249 | 2/1963 | Russell 260—40 |

MORRIS LIEBMAN, *Primary Examiner.*

L. T. JACOBS, *Assistant Examiner.*

U.S. Cl. X.R.

117—148, 161